UNITED STATES PATENT OFFICE.

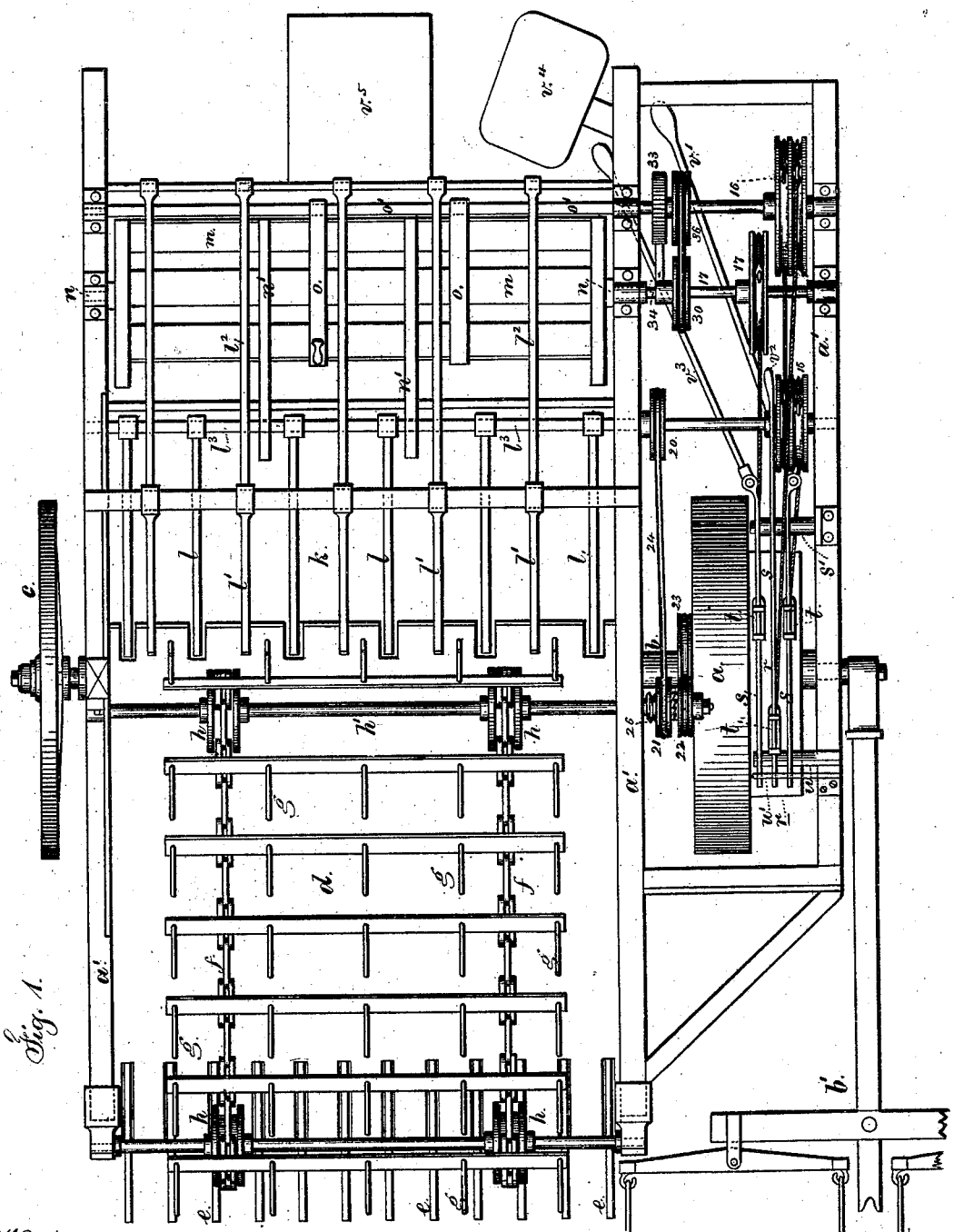

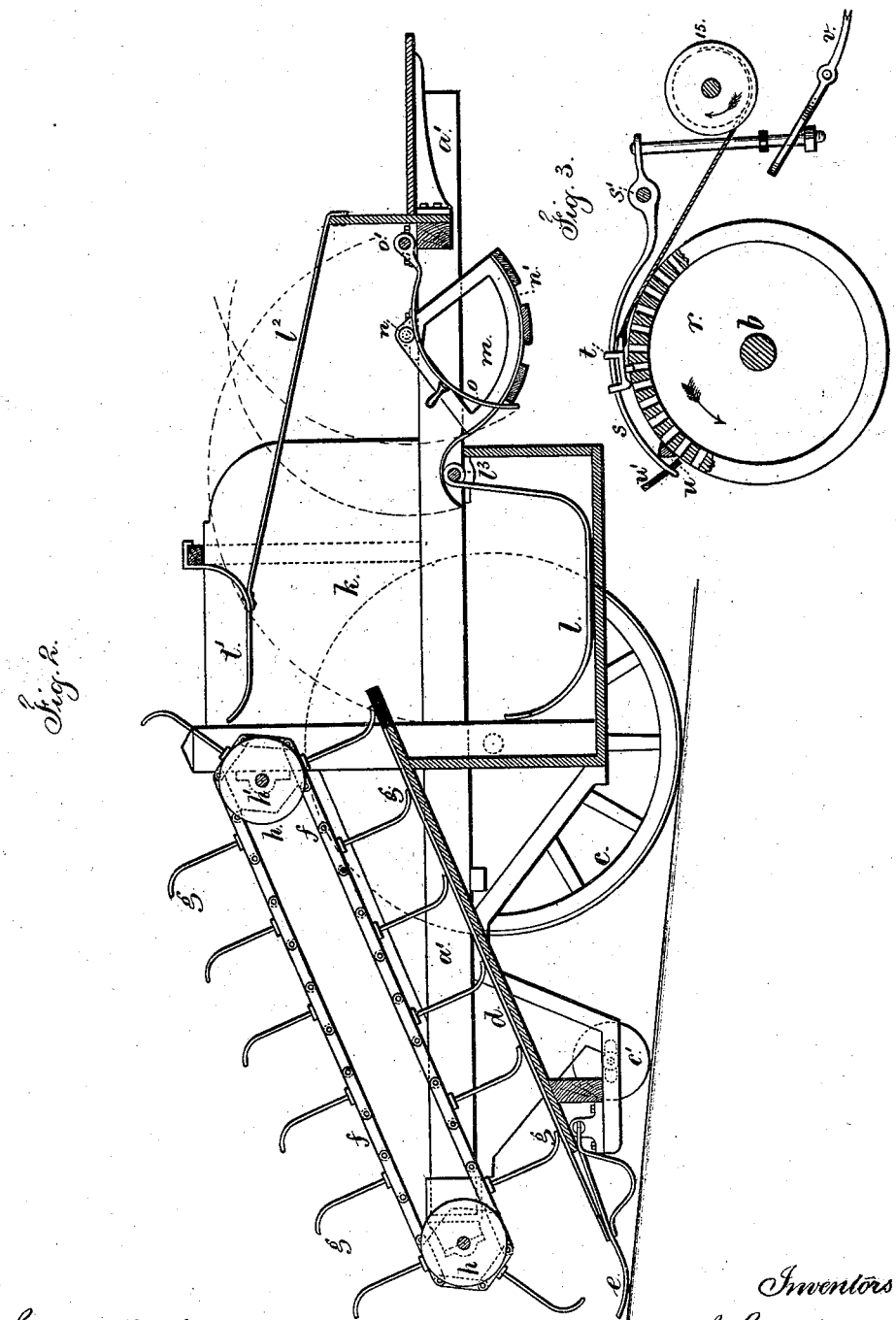

JOSEPH FRIEDLAENDER AND ISIDOR FRANK, OF VIENNA, AUSTRIA, AND CASIMIR JACHIMOWICZ, OF JAROSCHENKA, RUSSIA.

IMPROVEMENT IN GRAIN-BINDERS.

Specification forming part of Letters Patent No. 176,781, dated May 2, 1876; application filed February 1, 1876.

*To all whom it may concern:*

Be it known that we, JOSEPH FRIEDLAENDER and ISIDOR FRANK, of Vienna, Austria, and CASIMIR JACHIMOWICZ, of Jaroschenka, Russia, have invented an Improvement in Machines for Collecting Grain, Straw, &c., and binding the same, of which the following is a specification:

In this machine there are rake-fingers to pass beneath the grain or straw, an incline up which such grain is conveyed by an endless chain-rake, a receiver into which the grain falls upon a reversible gatherer that is partially revolved to lift the grain and deliver it into a cradle in which the bundle is compressed and bound, and from which it is dropped by the cradle being swung.

In the drawing, Figure 1 is a general plan of the machine. Fig. 2 is a longitudinal vertical section; and Fig. 3 is a section of the actuating-pulley and the connecting mechanism.

The main driving-wheel $a$ and its axle $b$ and land-wheel $c$ support the frame $a'$ of the machine, and to this frame the horses or other animals are attached by the pole or tongue $b'$, and there may be a lever and connection from such tongue to the front part of the machine, so as to raise and lower the same. It is, however, generally preferable to employ the guide-wheels or rollers $c'$ to determine the proximity of the front part of the machine to the ground. The incline $d$ is provided with fingers $e$ at the lower end, which fingers are adapted to under-run the grain or straw, and gather the same upon the incline as the machine is moved forward. The endless chains $f$, with their rakes $g$, are upon the wheels $h$, and the shaft $h'$ receives a revolving motion that causes the rakes to convey the grain up the incline and deliver the same into the receiver $k$ upon the reversible gatherer $l$. The stationary clearers $l^1$ serve to remove any straws that might adhere to the rake-teeth $g$. The receiver $k$ is in the form of a box, and the gatherers $l$ lie upon the bottom of the same while the grain is being received. When the gatherer is reversed and receives nearly a half-revolution, the grain is taken up and delivered into the cradle $m$. The standing guard-wires $l^2$ prevent the grain being thrown out, and the gatherers $l$ pass between these wires $l^2$. The gatherers $l$ are upon the shaft $l^3$, and to this the proper turning motion is given at the required movement, and it is preferable that the movement of the rakes $g$ be temporarily suspended until the gatherers are turned back into the receptacle. Any desired mechanism may be employed for giving these motions, but those hereafter described are preferable. The cradle $m$ is made as a segment of a cylinder, hung upon trunnions $n$, and there are slats running longitudinally that are connected by transverse bands $n'$ that rest upon the shaft $l^3$ in their normal positions. The compressor $o$ is made as a series of fingers projecting from the shaft $o'$, and after the grain has been delivered into the cradle this compressor is brought down upon the same to render the bundle compact and to hold the same while the attendant passes a wire around the bundle, or else draws the ends of a straw-band together and twists them, after which the cradle is swung forward to allow the bundle to drop out.

The mechanism for giving the motions aforesaid is preferably under the control of the attendant, and the motions are given at the proper times, according to the condition of the bundle of grain or straw.

Upon one side of the main wheel $a$ is the actuating-pulley $r$, that is provided with numerous mortises, as seen in Fig. 3, and over this wheel are the curved slide-bars $s$, upon which the slides $t$ are mounted, and each slide $t$ has a pin adapted to entering one of the mortises in the actuating-pulley $r$. When any one of these slide-bars is moved toward the wheel $r$ while the machine is in motion, the pin upon the slide enters one of the holes in $r$, and the slide is carried by the wheel along the bar $s$ until such bar $s$ is raised and the pin liberated by the slide $t$ coming in contact with the stationary incline $u$. These bars $s$ are moved either by hand or by a treadle. In the drawing these bars $s$ are represented as swinging upon the shaft $s^1$, and guided at their moving ends by the stationary slotted plate $u'$. There are two treadles, $v^1$ and $v^3$, represented, and one of the bars, $s$, is shown with a handle at $v^2$. From the slides $t$ there are cords or chains passing to the pulleys 15, 16, and 17 upon the shafts of the gatherer, the compressor, and the cradle, respectively, so that the attendant brings these into operation in succession, as required, by depressing the treadles or levers $v^1$ $v^2$ $v^3$, so that the parts receive the movements before named.

It will be evident that any desired number of these curved slide-bars, slides, cords, and treadles may be used, according to the operations to be performed, or the compressor may be thrown back by a connection between the pulleys 15 and 16, as shown, and then the gatherer will be returned to its position by the act of bringing down the compressor.

It is important that the revolving chain-rake $g$ be stopped when the gatherer is thrown over to deliver the grain into the cradle, and again started as the gatherer comes back. To accomplish this object the pulley 20 on the shaft of the gatherer is provided with a belt to the clutch-pulley 21, that is upon a screw on the shaft $h'$ of the rake $g$. The power revolves the pulley 22 by the belt to the wheel 23 on the main driver, and the clutch-teeth of 21 remain in contact with the clutch-teeth of 22, and the belt 24 constantly slips upon the pulleys 20 or 21, but when the pulley 20 is suddenly turned in the direction of the belt, but faster, the belt draws the pulley 21 around upon the screw 26, upon the shaft $h'$, and gives the same an endwise movement sufficient to disconnect the clutch-teeth, and the rollers 21 and rake $g$ stop, but the pulley 22 continues to move. When, now, the gatherer is reversed in its motion, the belt 24 revolves the pulley 21 upon its screw-shaft, and in so doing gives end motion sufficient to slide the coupling upon its feather and bring the teeth into contact with the teeth on the loose pulley 22, and start the motion of the rakes and their chains.

The operation of the machine is as follows: When sufficient straw or grain to form the bundle has been carried into the receiver $k$ by the rakes $g$, the attendant presses upon the treadle or lever $v^1$, and as the slide or traveler $t$ is carried forward by the wheel $r$ the pulleys 15, 16, and 20 are partially revolved, the clutch-pulleys 21 22 are disconnected, and the rake $g$ stopped, as before described. At the same time the shaft $l^3$ receives a partial rotation, and the gatherer $l$ carries the straw over into the cradle $m$. The attendant next raises the lever or slide-bar $s$ by its handle $v^2$ and by its traveler $t$, and the wheel $r$, the pulley 16, and shaft $o'$ are partially revolved to bring the compressors $o$ upon the straw in the cradle $m$ and hold it while being bound, the gatherer being simultaneously returned to place. Upon the shaft of the pulley 17 there is a pawl, 34, and also a pulley, 30, which latter is connected by a belt to a pulley, 36, upon the shaft $o'$. As said shaft $o'$ is partially revolved this pawl is brought in contact with a ratchet-wheel, 33, upon $o'$, and holds said shaft until the attendant completes binding the bundle. He then depresses the treadle $v^3$, which causes the partial revolution of the shaft of the pulley 17 in the reverse direction, liberating the pawl 34 from the wheel 33 and allowing the cradle to receive a partial rotation and deliver the said bundle. The cradle $m$ returns to place by gravity, and the levers $v^1$ $v^2$ may be returned to place by springs or weights after their travelers $t$ have been disconnected from the wheel $r$ by the incline $u$.

The attendant occupies the seat $v^4$, and there may be a second attendant at the seat $v^5$.

We claim as our invention,—

1. The incline $d$, with fingers $e$ at the lower end, in combination with the endless chain $f$, rake-teeth $g$, receiver $k$, and gatherers $l$, substantially as set forth.

2. The combination of the receptacle $k$, the gatherer $l$, the cradle $m$, and the compressor $o$, substantially as and for the purposes set forth.

3. The wheel $r$, connected with the main driving-wheel of the machine, and provided with recesses, in combination with the curved slide-bars $s$ and slides $t$, for communicating motion to the bundling mechanisms, substantially as set forth.

4. The pulleys for actuating the gatherer and compressor, in combination with the wheel $r$, the curved slide-bars $s$ and slides $t$, and connecting cords or chains, substantially as set forth.

5. The combination, with the endless-chain rake $g$, the receptacle $k$ for the grain, and the gatherer $l$, of mechanism for arresting the movement of the rake while the gatherer is delivering the grain, substantially as set forth.

Signed by us this 30th day of April, 1875.

JOSEPH FRIEDLAENDER.
ISIDOR FRANK.
CASIMIR JACHIMOWICZ.

Witnesses:
PHILIP SIDNEY POST,
WILLIAM HIMING.